United States Patent [19]

Chau

[11] Patent Number: 6,090,285

[45] Date of Patent: Jul. 18, 2000

[54] TANK TREATMENT ASSEMBLY

[76] Inventor: Yiu Chau Chau, 80 West Beaver Creek Road, Unit 14, Richmond Hill, Ontario, Canada, L4B 1H3

[21] Appl. No.: 09/130,712

[22] Filed: Aug. 6, 1998

Related U.S. Application Data

[63] Continuation-in-part of application No. 09/007,497, Jan. 15, 1998, abandoned.

[51] Int. Cl.[7] ............................. B01D 24/00; B01D 29/50
[52] U.S. Cl. ......................... 210/284; 210/190; 210/279; 210/288
[58] Field of Search ................................... 200/284, 255, 200/190, 191, 192, 205, 279, 287, 288, 289

[56] References Cited

U.S. PATENT DOCUMENTS

| | | | |
|---|---|---|---|
| 486,859 | 11/1892 | Davis | 210/284 |
| 1,088,929 | 3/1914 | Reisert | 210/284 |
| 2,176,549 | 10/1939 | Smith . | |
| 2,435,975 | 2/1948 | McGill | 210/190 |
| 2,666,031 | 1/1954 | Carr . | |
| 3,021,276 | 2/1962 | Mast | 210/687 |
| 3,126,335 | 3/1964 | Stipe | 210/126 |
| 3,239,063 | 3/1966 | Lamkin | 210/284 |
| 3,465,883 | 9/1969 | Jumper | 210/307 |
| 3,469,696 | 9/1969 | Petrucci et al. | 210/282 |
| 3,645,402 | 2/1972 | Alexander et al. | 210/266 |
| 4,235,718 | 11/1980 | Lopez | 210/191 |
| 4,659,460 | 4/1987 | Muller et al. | 210/284 |
| 4,769,143 | 9/1988 | Deutsch et al. | 210/284 |
| 4,966,692 | 10/1990 | Overy | 210/205 |
| 5,149,437 | 9/1992 | Wilkinson et al. | 210/665 |
| 5,171,442 | 12/1992 | Nakshbendi | 210/256 |
| 5,205,932 | 4/1993 | Solomon et al. | 210/264 |
| 5,215,657 | 6/1993 | Goldfield et al. | 210/284 |
| 5,217,606 | 6/1993 | Ramponi et al. | 210/136 |
| 5,242,589 | 9/1993 | Kuo et al. | 210/264 |
| 5,269,919 | 12/1993 | Von Medlin | 210/282 |
| 5,415,770 | 5/1995 | Heskett | 210/202 |
| 5,547,589 | 8/1996 | Carroll, II | 210/284 |
| 5,635,063 | 6/1997 | Rajan et al. | 210/284 |

FOREIGN PATENT DOCUMENTS

| | | |
|---|---|---|
| 2207745 | 6/1974 | France . |
| 849885 | 9/1952 | Germany . |
| 1287759 | 9/1972 | United Kingdom . |

*Primary Examiner*—David A. Simmons
*Assistant Examiner*—Frank M. Lawrence
*Attorney, Agent, or Firm*—Cook, Alex, McFarron, Manzo, Cummings & Mehler, Ltd.

[57] ABSTRACT

A tank top pretreatment unit and assembly comprises a treatment unit installed inside a water treatment tank, such as a water softener tank, and in the top of the tank for treating the water either prior to its treatment with the primary treating medium in the tank or following such treatment. The treatment unit includes a plurality of chambers which are configured to contain a finely divided water treatment medium of a different kind than the primary treatment medium. Some of the elements may be arranged in series, but many or all are arranged in parallel flow which reduces the pressure drop of the water across the treatment unit, and the inlet openings to the chambers and outlet openings from the chambers are elevationally spaced from each other and the area of the outlet openings is less than the area of the inlet openings to maximize contact and dwell time in the chambers. A housing is also disclosed which surrounds and contains some or all of the chambers to permit positioning of the treatment unit beneath the level of the primary treating medium.

37 Claims, 7 Drawing Sheets

TANK TREATMENT ASSEMBLY

RELATED APPLICATION

This application is a continuation-in-part of application Ser. No. 09/007,497, filed Jan. 15, 1998, now abandoned.

BACKGROUND AND SUMMARY OF INVENTION

The present invention is directed to a tank treatment assembly and, more particularly, to a treatment unit and fluid treatment system in which a treatment unit is mounted in the tank at its top and/or bottom for treating fluid entering and/or leaving the tank.

A wide variety of fluid treatment systems have been employed in the past in which the fluid is passed through a fluid treatment medium which is contained in some form of container or tank. For example, such systems have included water softening systems in which a bed of particulate ion exchange medium is contained in a water softener tank and the water to be treated is introduced through an inlet valve at the top of the tank, flows by gravity and pressure through the ion exchange medium, and the softened water is removed by way of an outlet or discharge from the bottom of the tank through a riser pipe which also passes through the top of the tank.

In such water softening systems it may frequently be desirable to pretreat the water prior to its passage through the ion exchange medium to remove undesirable constituents which might impair the function or reduce the life of the ion exchange medium or reduce the quality of the finally treated fluid. For example, such pretreatment might include the removal of large particulate contaminants which might ultimately collect in and clog the ion exchange medium. It may also be desirable to remove certain chemical contaminants or other constituents which might impart undesirable flavors and/or odors to the treated water, or which might impair or reduce the life of the ion exchange medium itself, such as chlorine which is frequently present in municipal water supplies. Such pretreatments and/or post treatments generally have been known in the past. For example in Heskett U.S. Pat. No. 5,415,770 it is disclosed that the use of certain finely divided metals, such as alloys of copper and zinc, to pretreat water to remove such chemical constituents, including residual chlorine, prior to subjecting the water to a water softening ion exchange medium is beneficial to prolong the life and function of the ion exchange medium, or may be utilized to post treat the water to remove contaminants which for example produce undesirable odors or flavors which were not removed by the ion exchange medium.

Such prior water treatment systems are subject to several disadvantages. For example, where the treatment medium is a finely divided copper and zinc alloy for the removal of chlorine and other constituents, the treatment unit was frequently located separately from the water softener tank in its water supply line to insure that the volume of the treatment medium and residence time was sufficient to perform its intended chlorine removal purpose and to permit ease of replacement of the treatment medium once it has been spent. If it was desired to locate the finely divided metal treatment medium in the same tank or container as the ion exchange medium to eliminate a tank from the system, it would generally be necessary to provide dividers or other containment to keep the particulate metal medium separate from the ion exchange medium, because they would tend to rapidly intermix with each other due to the disparity in weight between the two media. However, this is typically impossible due to the relatively small tank top opening which would not permit placing the relatively larger diameter dividers in the tank as would be needed, and it would be physically difficult to service or replace one medium without replacing the other due to their positioning relative to each other. If the treatment medium was to be placed in a container that would fit into the relatively small diameter opening in the preexisting tank top, the pressure drop of the incoming liquid would be too great due to the considerably reduced cross-sectional area of the treatment media and increased height for the same volume of media.

It is the purpose of the present invention to avoid and eliminate the aforementioned disadvantages. In the present invention a highly efficient fluid treatment unit is capable of being positioned completely inside the primary water treatment tank, for example a water softener tank, for containing a finely divided treatment medium to either pretreat the water prior to its exposure to the primary treatment medium, or to post treat the water after its exposure to the primary treatment medium, and to prevent intermixing of the two media. Due to the unique construction of the treatment unit of the present invention, it is capable of substantial reduction in size, yet permits full treatment of the incoming or outgoing water and with a minimum of pressure drop. Another advantage of the present invention is that the treatment unit of the invention is capable of mounting in or through the preexisting tank top opening, for example in a water softener tank, as were the prior control valves and mechanisms for operating the softener through its cycles and without reconfiguration or restructuring of the prior tank. Still another advantage of the present invention is that the treatment unit, together with its contained treatment medium, may be readily removed from the tank, serviced, and/or replaced without disturbing the primary medium in the tank. Still another advantage of the present invention is that the treatment medium may readily, thoroughly and effectively be backflushed at the same time and with the same backflushing liquids that are utilized to regenerate and/or backflush the primary treatment medium, for example the ion exchange resin in a water softener. Still another advantage of the pretreatment unit of the present invention is that it is possible to accommodate at least two different liquid treatment media with different backflushing requirements, one in the tank itself which has a much larger cross-sectional area and lower flow rate, for example an ion exchange resin, and the other in the treatment unit which has a much smaller cross-sectional area and higher flow rate, for example the much heavier metal particles as discussed in the aforementioned U.S. Pat. No. 5,415,770. Still another advantage of the present invention is that in some embodiments, several different media may be contained in the treatment unit of the invention. Still another advantage of the treatment unit of the present invention is that it may be wholly or partially submerged in the primary treatment medium, thus maximizing the amount of such primary treatment medium for a given tank size and/or minimizing the size of the tank for a given amount of primary treatment medium.

In one principal aspect of the present invention, a fluid treatment system for treating fluids includes a fluid treatment tank for containing a first fluid treatment medium therein. The tank includes an inlet for introducing the fluid to be treated to the tank, an outlet for discharging the fluid which has been treated by the first medium from the tank and a treatment unit in the tank at the inlet to the tank and positioned to receive the fluid introduced to the tank and pretreat before it is treated by the first medium when the first medium is contained in the tank, or which is positioned at the outlet of the tank to receive and treat the fluid which is being discharged from the tank. The treatment unit includes a chamber having an inner wall and an outer wall which define a space therebetween in the chamber for receiving and containing a second finely divided fluid treatment medium. At least one inlet opening extends through one of the walls of the chamber of the treatment unit for introducing the fluid to be treated to the space and so as to pass through the second medium to be treated thereby. At least one outlet opening also extends through another of the walls of the chamber for discharging the fluid which has been treated from the space, the outlet opening being constructed and arranged relative to the inlet opening to increase the time that the fluid dwells in the chamber during treatment of the fluid to increase the effectiveness of the treatment.

In another principal aspect of the present invention, in the aforementioned system and/or unit the inlet opening is positioned adjacent the top of one of the inner and outer walls, and the outlet opening is positioned adjacent the bottom of the chamber to cause the fluid to flow from the top to the bottom of the space in the chamber to increase the dwell time of the fluid during treatment.

In still another principal aspect of the present invention the outlet opening is positioned either in the bottom wall of the chamber or adjacent the bottom of the other of said inner and outer walls to cause said fluid to flow diagonally through said space to increase the dwell time of the fluid during treatment.

In still another principal aspect of the present invention, the area of the inlet opening is greater than the area of the outlet opening to increase the dwell time of the fluid during treatment.

In still another aspect of the present invention, a plurality of the chambers are arranged relative to each other so that the inlet openings of at least some of the chambers are arranged in parallel flow relationship to each other.

In still another principal aspect of the present invention, at least some of the chambers are also arranged in series to each other, and wherein one of the series chambers includes the inlet opening and another of the series chambers includes the outlet opening.

In still another principal aspect of the present invention, adjacent ones of the chambers are removably attached to each other.

In still another principal aspect of the present invention, a housing surrounds and contains some or all of the chambers, and the housing is constructed and arranged to receive fluid from or deliver fluid to the chambers which it contains.

In still another principal aspect of the present invention, at least some of the chambers are outside of the aforementioned housing and the last mentioned chambers have a given cross-sectional area and diameter; and the remaining chambers are within the housing, the housing has a diameter which is substantially equal to the given diameter, and the remaining chambers have a cross-sectional area which is substantially equal to the given cross-sectional area but an overall diameter which is substantially less than the given diameter to define a fluid flow channel between the remaining chambers and the housing.

In still another principal aspect of the present invention, the inner wall of the chambers defines a channel for the flow of the fluid.

In still another principal aspect of the present invention, in the system of the invention the inlet and outlet of the tank and the inlet of the pretreatment unit are at the top of the tank, the outlet of the tank includes a riser conduit which extends from adjacent the bottom of the tank into the channel of the unit, and the inner wall of the chamber surrounds the riser but is spaced therefrom whereby the channel communicates the fluid to be treated to the inlet openings of the chambers.

In still another principal aspect of the present invention, the system is a water softener system, the first fluid treatment medium is a water softening medium, and control means is provided to periodically reverse the flow of water through the water softening medium and the chambers for regeneration of the water softening medium and backflushing of both the first treatment medium and the second treatment medium.

In still another principal aspect of the present invention, where the system is a water softener system, it includes an adapter for mounting the water softener control means and the pretreatment unit in the top of the tank.

In still another principal aspect of the present invention, the second treatment medium is a finely divided metal alloy of copper and zinc.

In still another principal aspect of the present invention, the treatment unit is a pretreatment unit which is arranged in the aforementioned tank to pretreat the fluid prior to the treatment by the first fluid treatment medium.

In sill another principal aspect of the present invention, the treatment unit is a post treatment unit which is arranged in the aforementioned tank to treat the fluid after the treatment by the first fluid treatment medium.

These and other objects, features and advantages of the present invention will be more clearly understood through a consideration of the following detailed description.

BRIEF DESCRIPTION OF THE DRAWINGS

In the course of this description, reference will frequently be made to the attached drawings in which.

DESCRIPTION OF THE PREFERRED EMBODIMENTS

A water treatment system generally 10 is shown in the drawings. In a preferred application, the system 10 is a water softener system which typically includes an elongated water softener tank 12 which contains any one of a number of well known ion exchange media 14. The typical water softener tank also includes an opening 16 at the top in which a control unit 18 is mounted. The control unit 18 conventionally includes control valves (not shown) for introducing water to the tank for treatment and removing the treated water following treatment. The control unit also typically includes a timing or other mechanism (not shown) for reversing those flows to regenerate and/or backflush the medium 14. Also, in a typical water softener system, the opening 16 at the top of the tank 12 would include threads 20 as shown in the drawings and the control unit would include a downwardly extending boss 22 having outwardly facing threads 24 which would be threaded into the threads 20 in the tank opening 16 to mount the control unit 18 and its components to the top of the tank. However, this typical assembly is preferably somewhat modified in the present invention to accommodate the treatment units of the invention, as will be described below.

Figure 1:
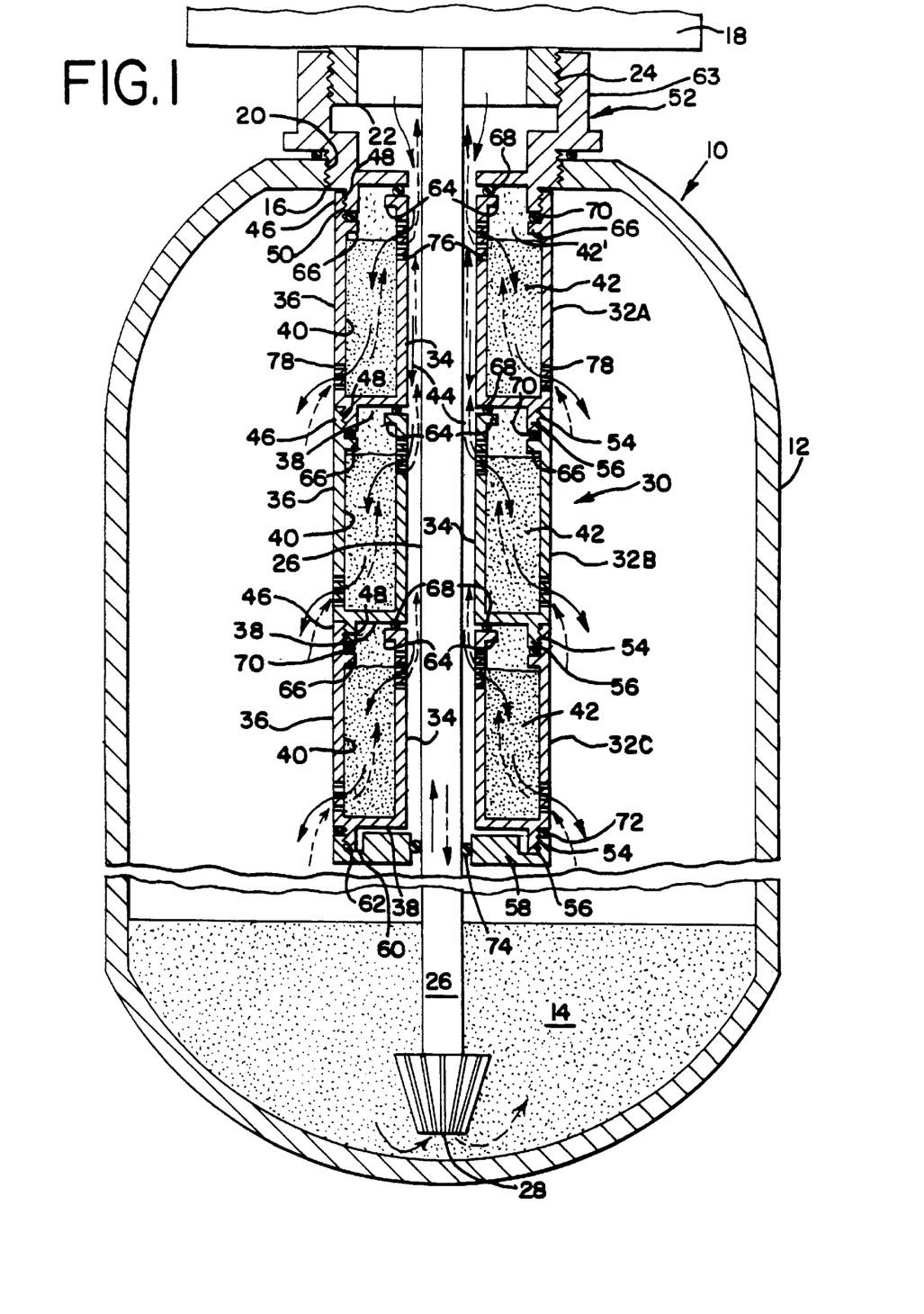
FIG. 1 is an overall, partially broken, cross-sectioned elevation view of a water treatment tank together with one embodiment of pretreatment unit incorporating the principles of the present invention.

In such water softening systems the water to be softened is introduced through an inlet valve (not shown) in the control unit 18 as previously mentioned and flows downwardly as shown by the solid arrows in the drawings and through the ion exchange medium 14 by gravity and municipal pressure. Following the softening treatment, the softened water is then discharged through a riser 26, the bottom of which opens at 28 in the bottom of the ion exchange medium 14 in tank 12 as shown in FIG. 1. The softened water flows upwardly through the riser 26 as shown by the solid arrows in the drawings, and out through a discharge outlet valve (not shown) in the control unit 18.

As previously discussed, one of the important features of the present invention is the provision of a pretreatment unit in the tank 12. As shown in FIG. 1, the pretreatment unit 30 comprises at least one and preferably two or more individual chambers 32. Although three chambers 32A–32C are shown in FIG. 1, it will be appreciated that fewer or more than the three chambers shown are contemplated.

Each of the chambers 32A–32C preferably comprises an inner wall 34 and an outer wall 36 which, together with a bottom wall 38, define a space 40 in each chamber for containing a pretreatment water treatment medium 42, which is different from the ion exchange medium 14, and which is preferably of a finely divided nature, for example, a particulate. The inner wall 34 of each chamber preferably has a transverse dimension which is somewhat larger than the width of the riser 26, so as to accommodate the riser therethrough, as well as to define an annular channel 44. The channel 44 is of sufficient size to permit the passage of the fluids to be treated therethrough and to the respective chambers 32A–32C, as shown by the solid arrows in the drawings.

The upper part 46 of the outer wall 36 of each of the chambers 32A–32C is preferably internally threaded at 48 to cooperate either with external threads 50 on a downwardly extending portion of a tank top adapter fitting 52 to attach the uppermost chamber 32A to the adapter fitting 52, or cooperate with outwardly facing threads 54 on a downwardly extending annular flange 56 which extends downwardly from the bottom wall 38 of each of the chambers 32 to attach succeeding chambers together. A closure plate 58 also is preferably provided at the bottom of the lowermost chamber 32C of the pretreatment unit 30, as seen in FIG. 1. The closure plate 58 includes an annular recess 60 having inwardly facing threads 62 which engage the outward facing threads 54 on the downwardly extending annular flange 56 of the bottommost chamber 32C.

As shown in the drawings, the tank top adapter fitting 52 is constructed to thread into the threads 20 of the tank top opening 16 in place of the boss 22 on the control unit 18 which would otherwise thread into that opening. The adapter fitting 52 also has an upwardly facing cylindrical portion 63 which has the same internal diameter as the tank top opening 16 and which receives the threads 24 on the boss 22. Thus, the adapter fitting 52 permits the control unit 18 and the pretreatment unit 30 to be mounted to the tank top without any reconfiguration or restructuring of the prior softener tank.

Although the tank top adapter 52 is shown and described, other means may be employed to mount the control unit 18 and/or pretreatment unit 30 at the tank top. For example, any one or more of the threaded couplings 20, 24 and/or 50 may be replaced by clamp or bayonet couplings. Moreover, in some installations the adapter 52 may be eliminated altogether, the boss 22 of the control unit 18 may be mounted directly into the opening 16, and the pretreatment unit 30 mounted to the boss 22 of the control unit 18.

Both the inner wall 34 of each chamber at its top and the outer wall 36 adjacent the bottom wall 38 preferably contain annular ledges 64 and 66, respectively, which cooperate with suitable O-rings 68 and 70 to seal the space 40 in each of the chambers to contain the fluid treating medium 42 in the chambers during all operating conditions, and in particular during backflushing. O-rings 72 and 74 are also provided adjacent the bottom of the pretreatment unit 30 at the closure plate 58 to seal the bottom of the unit at its lowermost chamber 32C, as shown in FIG. 1, to close the annular channel 44 against direct discharge of incoming water to the ion exchange medium 14. If the outlet from the tank 12 is through the bottom of the tank rather than through a riser 26 as shown, the riser may be eliminated as may the O-ring 74, and the closure plate would extend completely across the unit 30 without any opening for the riser.

As shown in FIG. 1, the inner wall 34 of each of the chambers 32A–32C includes inlet openings 76 to each of the chambers, and the outer wall 36 of each chamber includes outlet openings 78. These respective openings 76, 78 may be formed in any one of a number of suitable shapes and distributions, such as spaced slots or openings through the respective inner and outer walls 34 and 36 of each of the chambers 32A–32C. However, whatever sizes and shapes are selected, they should be such as to restrain the pretreatment medium 42 within the space 40 of each chamber to keep it from intermingling with the primary treatment medium 14 in tank 12.

One important feature of the present invention is that the inlet openings 76 in the inner walls 34 are preferably positioned adjacent the top of the inner walls, whereas the outlet openings 78 are positioned adjacent the bottom of the outer walls 36 as seen in FIG. 1. This insures that the fluid flow through the space 40 of each chamber 32 and its fluid treating medium 42 is maximized in length so as to run diagonally from the top of the chamber to the bottom, rather than laterally short-circuiting through the narrower dimension of each space 40.

A second important feature of the present invention is that the size and/or number of the inlet openings 76 and outlet openings 78 are preferably selected relative to each other so that the total area of the inlet openings 76 is greater than the total area of the outlet openings 78. This, too, will tend to maximize dwell time in the fluid treating medium 42 by causing the fluid to back up in a manner to tend to flood the spaces 40, impart a downward packing pressure to the medium 42 during treatment, and improve the lift of the particles of the medium during the backflushing as shown in FIG. 1 at 42'.

A third important feature of the present invention is that more than one of each of the chambers are preferably positioned in parallel relationship to each other, as shown in FIG. 1. This will result in the substantial reduction of the pressure drop across the pretreatment unit as compared to the pressure drop that would normally be experienced in pretreatment units of the same height, but in which the water flowed through the same amount of treating medium but in series from top to bottom.

To illustrate this substantial advantage and reduction in pressure drop, the pressure drop can be represented by the following formula:

$$P \; D/A$$

where P is the pressure drop, D is the depth of the medium, and A is the cross-sectional area of the medium. From this formula, it will be seen that for a depth D of 1 and area A of 1 for a single chamber 32, the pressure drop will be 1. However, if two chambers 32A and 32B are provided as shown in FIG. 1 and in which the overall length of the unit remains the same, D will be ½, A will be 2, and the pressure drop across the two chamber pretreatment unit 30 will be exponentially lowered to ¼. Carrying this example still one step further, if three chambers 32A, 32B and 32C are provided as shown in FIG. 1 and in which the overall length of the unit still remains the same, D will be ⅓, A will be 3, and the pressure drop across the three chamber pretreatment unit 30 will be exponentially lowered to ⅑.

From this it will be appreciated that not only the relative position and size relationship of the inlet openings 76 to the outlet openings 78 and the provision of the multiple plural chambers 32A–32C as shown in FIG. 1 substantially will improve the dwell time and exposure of the incoming water to the finely divided fluid treatment medium 42 and result in substantially reduced pressure drop, but substantial advantages also exist during backflushing. In this regard it will be appreciated that the much smaller depth of the treating medium 42 in each of the respective chambers as compared to the larger total depth of such medium if the same amount of medium was combined into one large, tall chamber, will substantially enhance the lifting power of the backflushing fluid. This backflushing flow, as depicted by the dotted arrows in the drawings, will be able to lift the medium 42 to fill the entire space, as depicted by the floating particles 42' as shown in the drawings, and permit the medium to be thoroughly backflushed in the direction of the dotted arrows as shown.

It will also be appreciated that the plural elements 32 as shown in the drawings are readily separable from each other and may be sequentially added each to the next preceding element to custom build the pretreatment unit 30 to the size desired using a plurality of like elements. Thus, parts inventory is substantially simplified.

In the operation of the embodiment shown in FIG. 1, the fluid to be treated, e.g. water in the case of the water softening system as thus far described, is introduced to the adapter fitting 52 through the control unit 18, and will pass downwardly through the annular channel 44 as shown by the solid arrows in FIG. 1.

This water will sequentially enter each of the respective chambers 32A–32C in parallel through the inlet openings 76 at the top of each of the chambers, will flow downwardly and diagonally through the water treatment medium 42 in the space 40 of each of the chambers, and outwardly through the outlet openings 78 at the bottom of each of the chambers. Due to the top and bottom positioning respectively of the inlet openings 76 and outlet openings 78 relative to each other, the incoming water is directed into a diagonal maximum length path of flow through each of the chambers, and due to the differential in areas between the inlet openings 76 and outlet openings 78 as previously described, the water will tend to back up in each of the chambers to maximize its residence time in each of the chambers, and will also tend to pack the water treatment medium 42 in each of the chambers to maximize the treatment efficiency. The water treatment medium in each of the chambers is preferably a finely divided medium, such as activated carbon or the finely divided copper and zinc metal particles of the kind described in the aforementioned U.S. Pat. No. 5,415,770.

When the water leaves the outlet openings 78, it will flow downwardly through the primary treatment medium in the tank 12, for example the ion exchange medium 14 in a water softener. Following softening, the softened water will be discharged from the tank through the riser opening 28 in the bottom of the tank, the riser 26 and the control unit 18, and as shown by the solid arrows in FIG. 1.

When it is desired to regenerate the ion exchange medium 14 and/or backflush it, the control unit 18 will be actuated, for example by a timer in the control unit, to reverse the flow through the system. This regeneration and/or backflushing flow is depicted by the dotted arrows in FIG. 1. Accordingly, the backflushing water will flow downwardly through the riser 26, and out through the riser opening 28 into the bottom of the tank 12, upwardly through the ion exchange medium 14, and in parallel into the bottom of each of the respective chambers 32A–32C through the openings 78, upwardly through the treatment medium 42 in each of the chambers, outwardly through each of the openings 76 at the top of the respective chambers, through the annular channel 44, through the adapter fitting 52, and will be discharged from the system through the control unit 18. Due to the relatively shallow depth of the treatment medium 42 in each of the chambers and the upward diagonal flow through the chambers, the particulate medium 42 will be exposed to maximum lift to maximize backflushing of that medium, as shown by the suspended particles 42' in FIG. 1. Backflushing will also likely result in some lifting of the medium 14 into the space in the tank 12 around the pretreatment unit 30 to maximize the cleaning of the medium 14. However, the medium 14 will not enter the chambers 32A–32C because the outlet openings 78 are sized to preclude passage of the medium 14.

The embodiment of pretreatment unit 30 as thus far described and shown in FIG. 1 is arranged for parallel flow through each of the elements 32A–32C and thereby enjoys the optimum minimum pressure drop which has been earlier described. Several additional embodiments of multiple chamber treatment units are shown in FIGS. 2–7 which may also enjoy the pressure drop advantages, but also other advantages.

In the embodiments to be described to follow, various components of the respective treatment units have been varied somewhat. However, like reference numbers will be used to designate same or similar components in the units in the respective embodiments.

Figure 2:
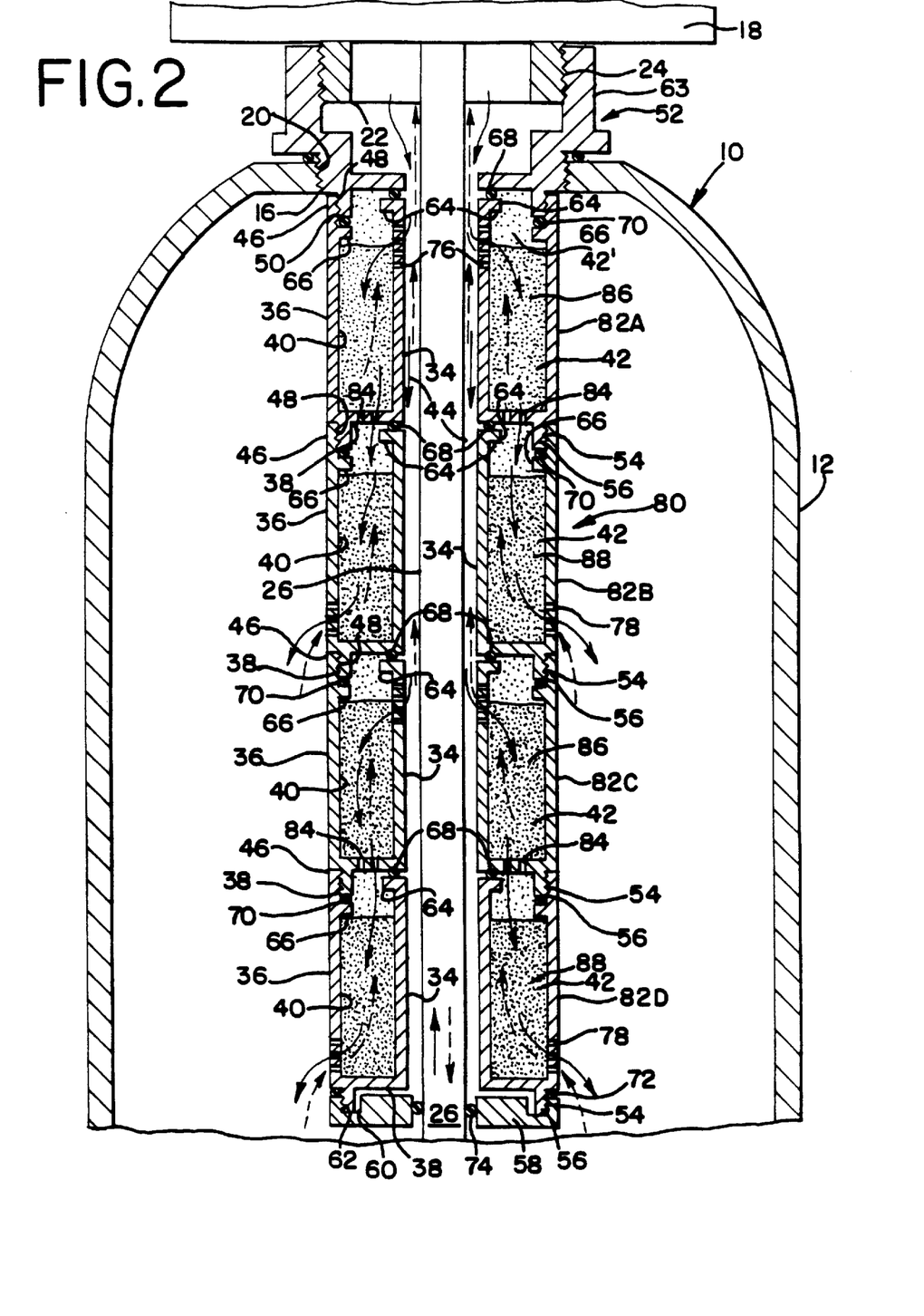
FIG. 2 is a broken, cross-sectioned elevation view of a water treatment tank together with a second embodiment of pretreatment unit incorporating the principles of the present invention.

In the embodiment of pretreatment unit 80 shown in FIG. 2, two of the adjacent chambers 82A–82B and 82C–82D are arranged in series flow relationship with each other and then those series pairs or sets are arranged in parallel flow relationship relative to each other. In this embodiment, the chambers in each of the respective series pairs or sets are constructed somewhat differently from those shown in FIG. 1 in a few aspects. In the embodiment shown in FIG. 2, the lead upstream chamber 82A or 82C in each chamber set will include the inlet openings 76 at their tops as previously described for chambers 32A–32C, but the outlet openings 78 in the outer wall 36 will be replaced by outlet openings 84 in the bottom walls 38 of chambers 82A and 82C. Conversely, in the trailing downstream chambers 82B and 82D in each chamber set, the outlet openings 78 are retained, but the inlet openings 76 at the top of the inner walls 34 of the previously described chambers 32A–32C are eliminated.

By placing two adjacent chambers in series with each other to form a chamber set, the use of two different treatment media in the pretreatment unit 80 will be facilitated. For example, the first medium 86 in the first chambers 82A and 82C which the water is to encounter in each chamber pair or set might be the metal copper and zinc particles of the kind described in the aforementioned U.S. Pat. No. 5,415,770. The second medium 88 in the second chambers 82B and 82D in each element pair or set may be activated carbon. Thus, the advantages of both pretreatment media may be enjoyed, although some pressure drop advantage may be sacrificed.

The operation of the embodiment shown in FIG. 2 will be essentially the same as that previously described with respect to the embodiment shown in FIG. 1, except that the flow through adjacent chambers 82A,B and 82C,D and their respective media 86 and 88 will be in series, but will still be in parallel through each of the sequentially adjacent element pairs or sets.

In the embodiments thus far described, the outlet openings 78 have been positioned adjacent the bottom of the outer walls 36 of the chambers to insure that the fluid flow through the space 40 of each of the chambers 32 or 82 is maximized in length and so as to run diagonally from the top of the chamber to the bottom, rather than laterally short-circuiting through the narrower dimension of each space 40. Although this fluid flow length is maximized by diagonal flow through the spaces 40, it has been discovered that a dead zone may arise in the fluid treatment medium where the flow is diagonal, for example, in the lower corner of the space 40 adjacent the intersection of the inner wall 34 and bottom wall 38, as viewed in FIG. 1. This dead zone may reduce the efficiency of each of the chambers to as low as about 80% efficiency.

Figure 3:
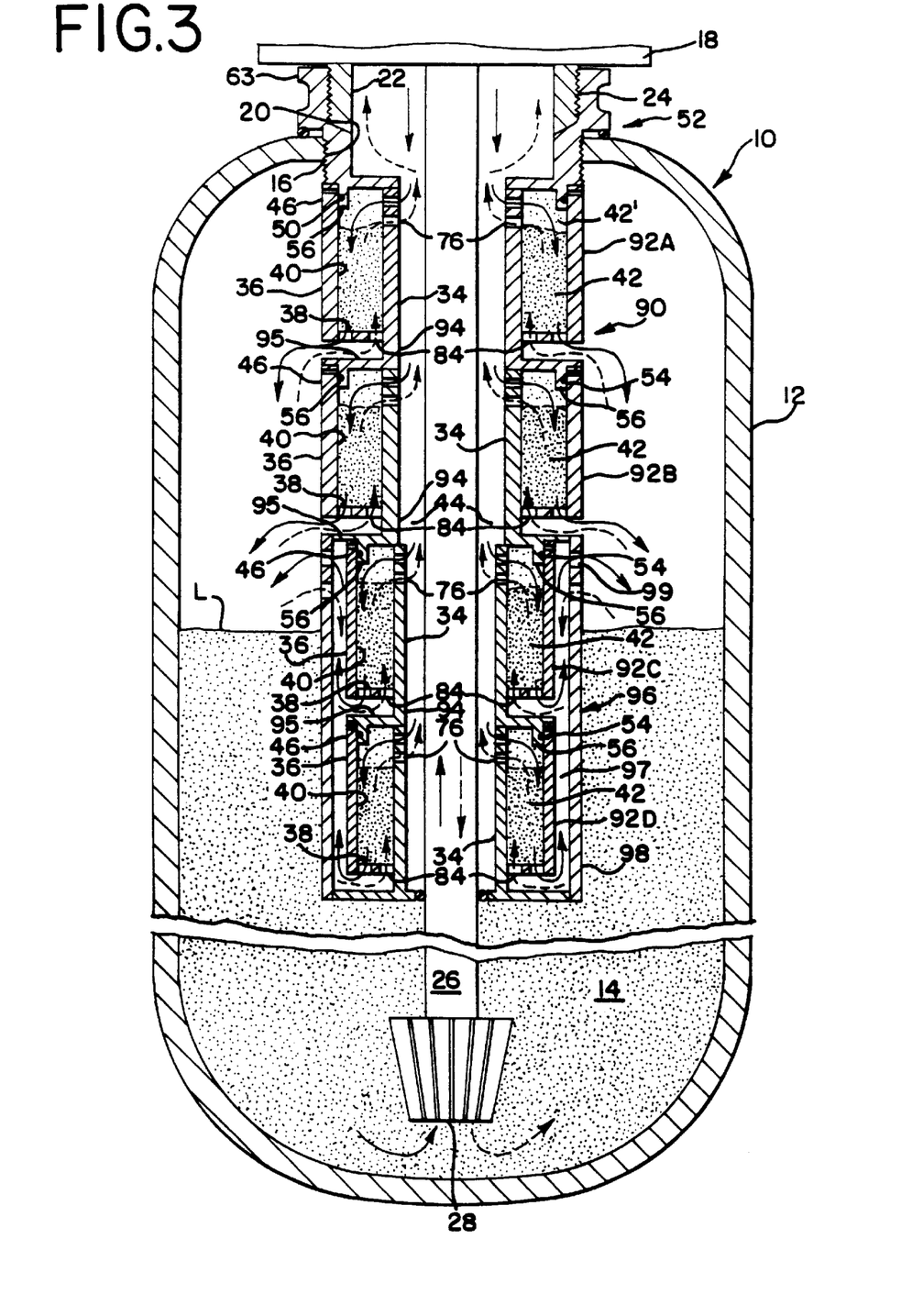
FIG. 3 is a partially broken, cross-sectioned elevation view of a water treatment tank together with a third embodiment of pretreatment unit incorporating the principles of the present invention.

As shown in the embodiments of FIGS. 3–7, in general each of the chambers are slightly separated from each other and outlet openings 84, as also seen in the embodiment previously described in FIG. 2, have been placed in the bottom walls 38 of the chambers. In order to permit discharge of the fluids from the chambers to the interior of the tank 12, as shown by the solid arrows in FIG. 3, the inner wall 34 of each of the chambers 92A–92D has been extended as shown at 94, and a ringed flange 95 having the downwardly extending annular flange 56 as previously described for coupling adjacent chambers together is adapted to attach to the next lower chamber. As seen in FIG. 3, the ringed flange 95 is spaced from the underside of the bottom wall 38 of its chamber and its outlet openings 84 to permit flow from the outlet openings 84 to the interior of the tank 12 and downwardly through the ion exchange medium 14. By placing the outlet openings 84 in the bottom wall 38, rather than at the bottom of the outer wall 36, it has been found that the utilization of the volume of the fluid treating medium 42 in each of the chambers 92 may be improved to improve the efficiency of the chambers to as great as 90% or more.

Also as shown in the FIG. 3 embodiment, the two bottom chambers 92C and 92D have been enclosed in a housing 96 which is preferably of the same overall diameter as the diameter of the outer walls 36 of the two top chambers 92A and 92B. To permit this, the overall diameter of the two lower chambers 92C and 92D which are located in the housing is reduced and the inner walls 34 of the chambers moved closer to the riser 26 so as to maintain the total cross-sectional area of each of the chambers approximately the same as the upper chambers 92A and 92B, but so as to reduce the cross-sectional area of the channel 44 to approximately one-half the area which is present at the upper chambers 92A and 92B. This is possible because one-half of the incoming fluid has already been treated by the two upper chambers 92A and 92B. Thus, the channel 44 at the two bottom chambers 92C and 92D need only conduct the remaining one-half of the fluid. By reducing the overall diameter of the two lower chambers 92C and 92D as shown in FIG. 3, an annular channel 97 may be provided between the outer wall 98 of the housing 96 and the outer walls 36 of the two lower chambers 92C and 92D in the housing. Outlet openings 99 are also provided at the top of the housing and above the level L of the resin 14 to permit the discharge of the fluid, as shown by the solid arrows, which has been treated by the medium in chambers 92C and 92D from the housing 96 and into the tank 12 so that it may pass down through and be treated by the resin medium 14.

The housing 96 makes possible any one or more of the following advantages. One thing that is made possible by the housing is that additional pretreatment may be provided to the incoming fluid because the volume of pretreatment medium may be extended further into the tank so that it is actually extended beneath the level of the resin as shown in FIG. 3. Without the housing 96, the depth of the pretreatment unit has been typically limited to a depth which is no deeper than the upper level L of the resin 14, for example as shown in FIG. 1. However, the housing 96 permits the pretreatment unit to extend further into the tank and beneath the resin level. Another advantage of the housing 96 which surrounds the lower chambers is that it may also permit a shortening of the height of the tank 12 because the resin 14 may now extend higher into the tank without limitation from the length of the pretreatment units, and/or for the same tank height, the volume of resin 14 may be increased because it is no longer as limited when the pretreatment unit had to remain clear of the resin level L. Also by virtue of the ability to reduce the overall diameter of the lower chambers 92C and 92D to provide for the annular channel 97 and maintain the overall diameter of the housing 96 to a diameter which is no larger than the diameter of the upper chambers 92A and 92B, the pretreatment unit 90 continues to enjoy the ability of insertion into and removal from the tank through the presized tank opening 16.

The operation of the embodiment shown in FIG. 3 will be essentially as previously described with respect to the embodiment shown in FIG. 1, except that the incoming flow of fluid which enters the inlet openings 76 of the chambers 92A and 92B will pass through the medium 42 in those chambers and then exit from the bottom outlet openings 84 in the bottom wall 38 of each of the chambers 92A–92D. From there the pretreated fluid will pass through the space between the ringed flange 95 of the chamber and its bottom wall 38 into the tank 12, through the ion exchange medium 14 in the tank and out through the riser 26.

The remaining one half of the fluid which does not pass through chambers 92A and 92B will continue to pass down through the annular channel 44 around the riser 26 and then through the inlet openings 76 of the two lower and somewhat smaller overall diameter chambers 92C and 92D, through their outlet openings 84 in their bottom walls 38, and then will flow upwardly through the annular channel 97 in housing 96, out through the outlet openings 99 in the housing into the interior of the tank 12, where it will flow down through the resin 14 to be discharged from the tank through the riser 26. As previously described, fluid service flow is shown by the solid arrows in FIG. 3, and backflush flow is shown by the dotted arrows.

Figure 4:
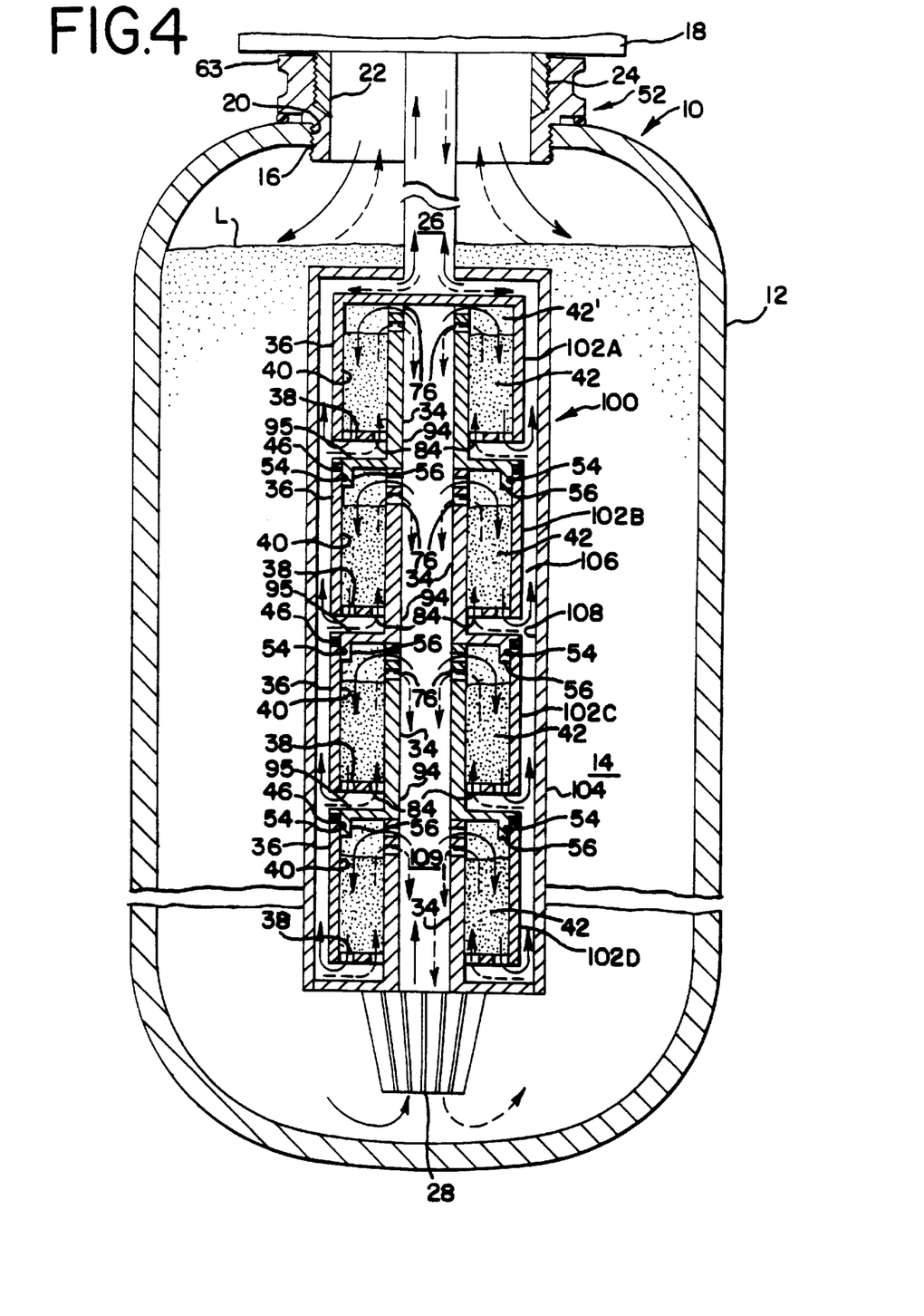
FIG. 4 is a partially broken, cross-sectioned elevation view of a water treatment tank together with a fourth embodiment of treatment unit for post treatment and incorporating the principles of the present invention.

In the embodiment of treatment unit 100 shown in FIG. 4, all of the chambers 102A–102D have been enclosed within an extended housing 104. Again, the external diameter of housing 104 is preferably slightly smaller than the diameter of the opening 16 at the top of tank 12 to permit the treatment unit 100 to be installed into and removed from the tank 12 through that opening. Control of the diameter of the housing 104 is made possible by maintaining the total cross-sectional area of chambers 102A–102D the same as in the chambers in the previous embodiments by eliminating the riser 26 between the chambers to permit a reduction of the overall diameter of the inner walls 34 to the diameter of the previous riser. This permits the overall diameter of the outer walls 36 of the chambers 102A–102D to also be reduced without a loss of total cross-sectional area. This provides for an annular channel 106 between the outer walls 36 of the chambers 102A–102D and the outer wall 108 of housing 106.

The housing 104, which totally encloses all of the chambers 102A–102D, permits the treatment unit 100 to be completely submerged in the resin 14 in tank 12, as shown in FIG. 4. This in turn permits a substantial increase in resin volume without an increase in tank size and/or a substantial reduction in tank size for a given volume of resin.

The system shown in FIG. 4 is somewhat different than the systems thus far described. In the FIG. 4 system, the treatment unit 100 is positioned to be a post treatment rather than a pretreatment unit as previously described. In the FIG. 4 system, the fluid first passes through the ion exchange medium 14 and then through the treatment unit 100 before leaving the tank.

The operation of the embodiment shown in FIG. 4 will be as previously described, except that after passing through the ion exchange medium 14, the fluid as shown by the solid arrows, will then pass through the bottom opening 28 of what was previously the riser and, instead of leaving the treatment system will flow upwardly through the channel 109, through the inlet openings 76 in the inner walls 34 of the respective chambers 102A–102D, through the fluid treatment medium 42 in the chambers, outwardly through the outlet openings 84 in the bottom walls 38 of the chambers, upwardly through the annular housing channel 106, and out of the tank 12 through the short top riser 26. Again, reverse flow or backflushing is depicted by the dotted arrows as viewed in FIG. 4.

Figure 5:
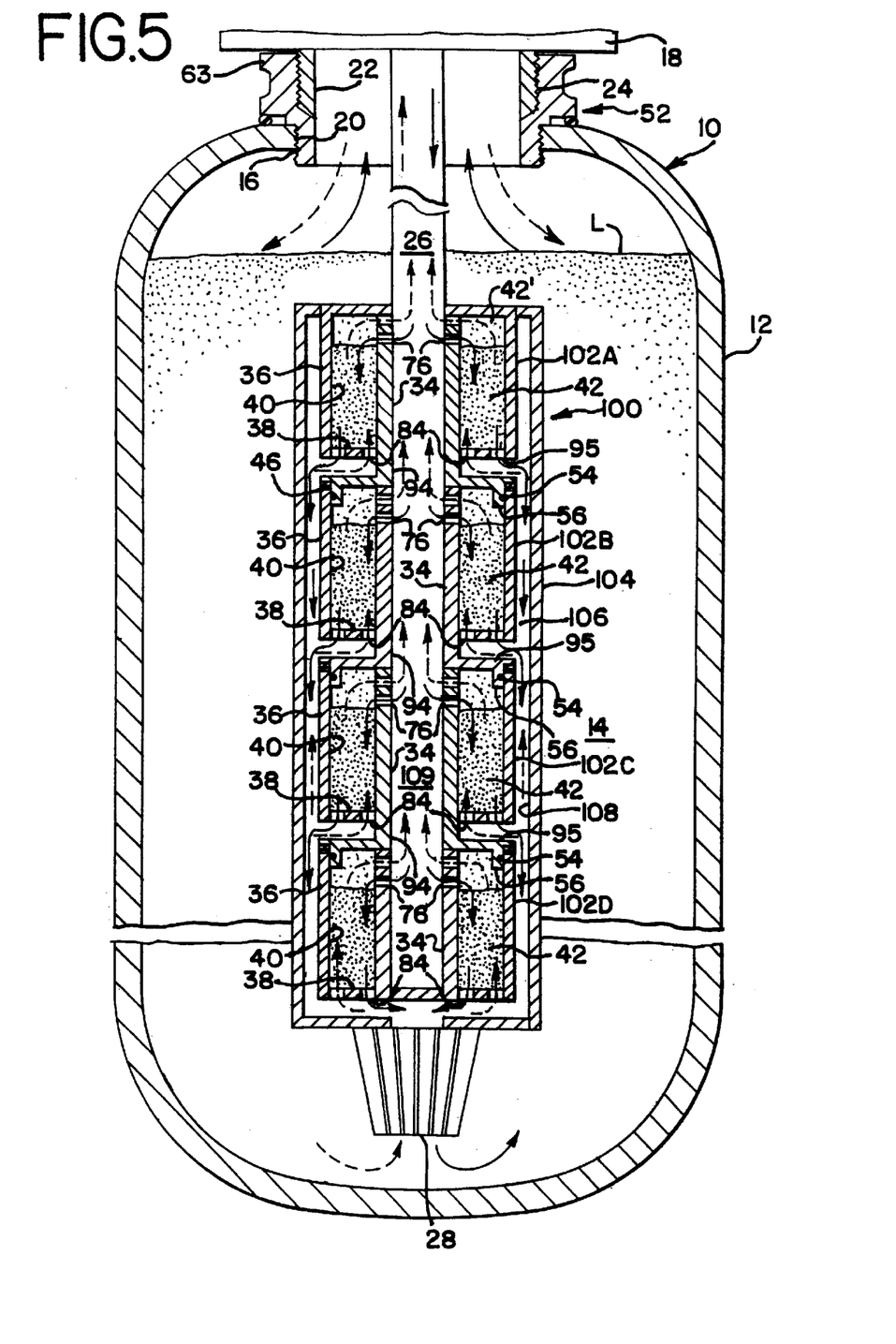
FIG. 5 is a partially broken, cross-sectioned elevation view of a water treatment tank together with a fifth embodiment of pretreatment unit incorporating the principles of the present invention.

The embodiment of treatment unit 100 shown in FIG. 5 is virtually identical in structure to the unit shown in FIG. 4. The only difference of any substance between the embodiments in FIGS. 4 and 5 is that the flow has been reversed in the unit shown in FIG. 5 so that the treatment unit 100 in FIG. 5 is again a pretreatment unit, rather than a post treatment unit as shown and described in FIG. 4.

The operation of the embodiment shown in FIG. 5 again will be essentially the same as that previously described, except that the fluid to be treated will now enter through the short top riser 26 and will pass down through the channel 109 between the inner walls 34 of the chambers 102A–102D. From the channel 109 the fluid will pass through the inlet openings 76 at the upper ends of the inner wall 34 of the respective chambers 102A–102D, through the medium 42 in the chambers, through the outlet openings 84 in the bottom wall 38 of the chambers, the annular channel 106 in the housing 104, and out of the housing through the bottom opening 28, upwardly through the ion exchange medium 14 and outward through the opening 16 in the top tank 12. Again, the reverse flow, as occurs during backflushing is depicted by the dotted arrows in FIG. 5.

Figure 6:
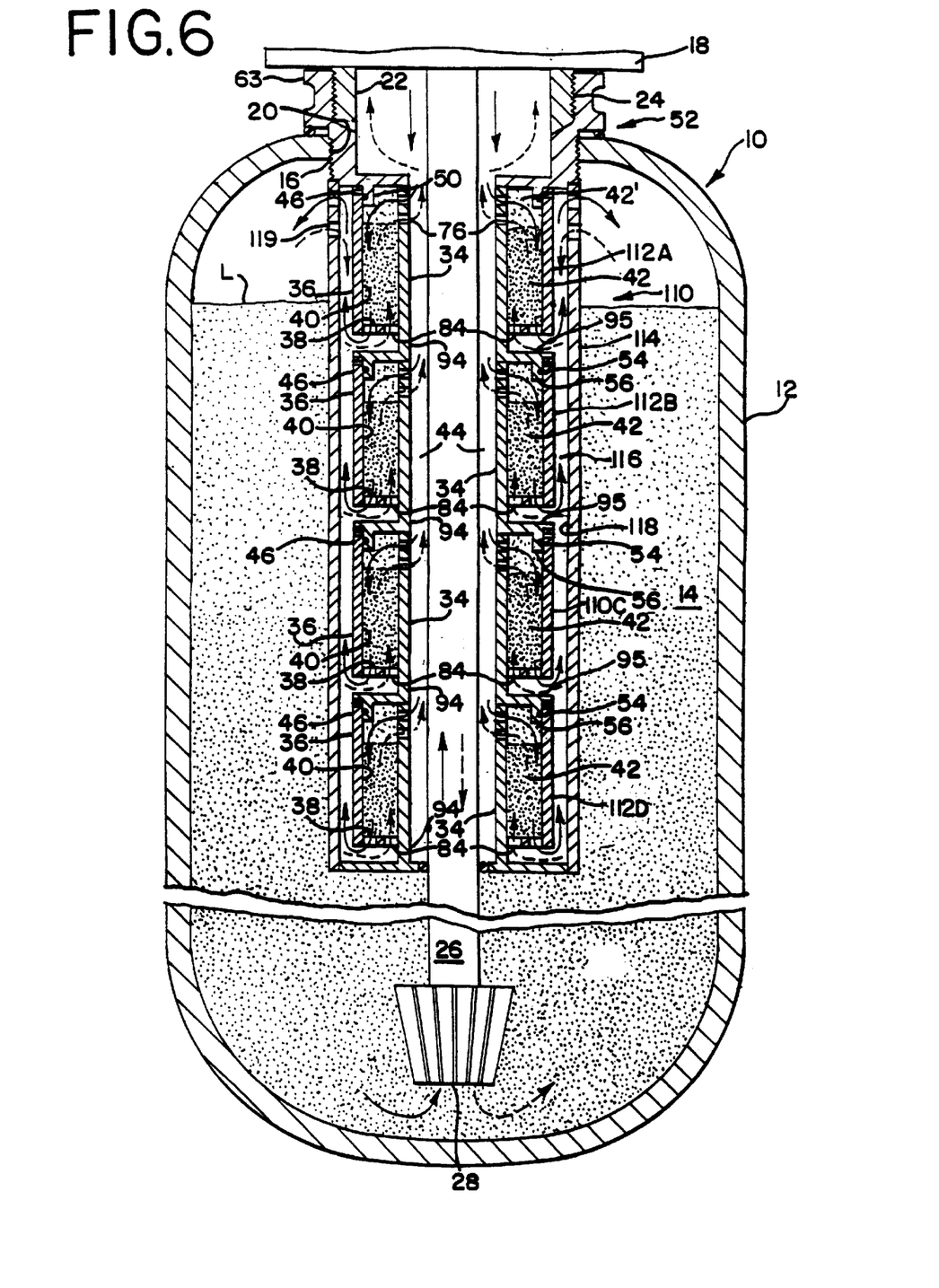
FIG. 6 is a partially broken, cross-sectioned elevation view of a water treatment tank together with a sixth embodiment of pretreatment unit incorporating the principles of the present invention.

The embodiment of pretreatment unit 110 shown in FIG. 6 is similar in many aspects to the lower chamber and housing construction in the embodiment shown in FIG. 3, except that the lower housing in FIG. 3 has been extended upward to enclose all of the chambers. The unit 110 comprises several chambers 112A–112D, which are virtually the same as the chambers 92C–92D in FIG. 3. The principal difference between the embodiment shown in FIG. 6 and that shown in FIG. 3 is that the housing 114 is attached at the top of the tank 12 adjacent the opening 16 at the adaptor fitting 52. This permits maximizing both the level of the ion exchange resin 14 in the tank 12 as well as the quantity of pretreatment medium 42 that may be present in the pretreatment unit 110 because it places the unit as close as possible to the tank top. Another difference between the embodiment shown in FIG. 6 and that of FIG. 3 is that the incoming fluid to be treated, after passing through the chambers 112A–112D and the annular channel 116 at the outer wall 118 of the housing, will flow almost to the top of the tank 12 in the housing 114 and out through the housing outlet openings 119 at the top of the housing and above the resin level L.

The operation of the embodiment shown in FIG. 6 again will be essentially the same as that previously described, except that the incoming fluid to be treated, after passing through the chambers 112A–112D as shown by the solid arrows in FIG. 6, will flow upwardly through the annular channel 116 at the outer wall 118 of the housing and into the tank 12 through the housing outlet openings 119, will flow down through the ion exchange resin 14, through the riser opening 28 and upwardly through the riser 26 to be discharged from the system.

Figure 7:
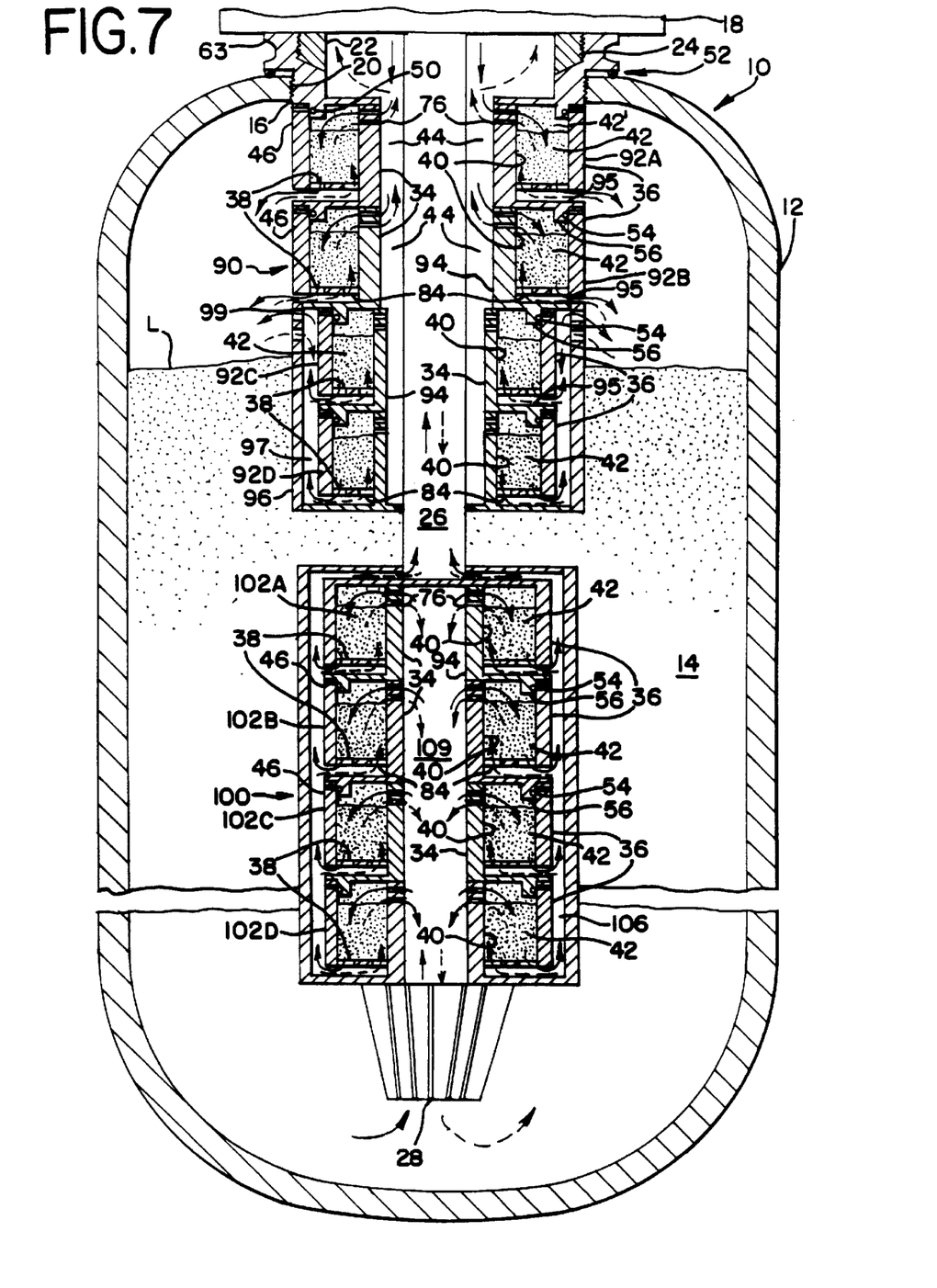
FIG. 7 is a partially broken, cross-sectioned elevation view of a water treatment tank together with a seventh embodiment of treatment unit system for both pre and post treatment and incorporating the principles of the present invention.

In the embodiment of treatment unit shown in FIG. 7, the system includes both a pretreatment unit and a post treatment unit. The top pretreatment unit shown in FIG. 7 is essentially the treatment unit 90 in the embodiment described in FIG. 3. The bottom post treatment unit shown in FIG. 7 is essentially the treatment unit 100 shown in the FIG. 4 embodiment.

The operation of the embodiment shown in FIG. 7 starts with the flow of incoming fluid to be treated as shown by the solid arrows which passes downwardly through the annular channel 44 about the riser 26, through the inlet openings 76 of the chambers 92A–92D, and out through the outlet openings 84 from the chambers. As described in the FIG. 3 embodiment, the discharge from the two top chambers 92A and 92B then passes directly into the tank 12 to flow downwardly through the ion exchange medium 14. The discharge from the two bottom chambers 92C and 92D flows through the annular channel 97 of the housing 96 and is then discharged from the housing outlet openings 99 at the top of the housing into the tank 12 to flow downwardly through the ion exchange medium 14.

Once the fluid has been treated by the medium 14, the treated fluid is discharged through the discharge opening 28 at the bottom of the tank and into channel 109 in the bottom post treatment unit 100. From there, the treated fluid will flow through the inlet openings 76 at the tops of the chambers 102A–102D, through the medium in the chambers, out through the outlet openings 84 in the bottom walls of the chambers, and upwardly through the annular channels 106 into the riser 26 to be discharged from the tank. Again, the direction of flow during backflush is depicted by the dotted arrows in FIG. 7.

Although the threaded attachment and O-ring seal construction of the respective chambers to and relative to each other have not been depicted with the same specificity of detail in the embodiments shown in FIGS. 3–7 as they were in FIGS. 1 and 2, they are preferably of the same general nature as shown in FIGS. 1 and 2 and will be clearly within the skill of those skilled in the art when considering the detailed showings in FIGS. 1 and 2.

It will be appreciated that the size of the opening 16 at the top of the tank 12 in each or any of the above described embodiments may be any one of a number of sizes typical of conventional softener tanks. For example, these openings may be 2½, 4 or 6 inches in diameter as are typical to various commercially available water softener unit tanks. The advantage of the treatment unit or tank top unit of the present invention is that it may be readily dimensioned to be installed through or removed from any of these typical opening sizes without reconfiguration or reworking of the tank and/or loss of fluid treating efficiency.

It will also be appreciated that the number of chambers and/or chamber sets which may be positioned in series and/or parallel may vary from those shown in the drawings without departing from the principles of the invention.

By way of example, typical water softening tanks, such as the tank 12 shown in the drawings, may have a height of 30–54 inches and a diameter of 6–15 inches. The ion exchange medium 14 will typically fill about one-half of the height of the tank and the tank top opening 16 will typically be about 2½–6 inches in diameter as previously mentioned. In a preferred embodiment, the height of each of the chambers is between 3–6 inches and enough chambers will be sequentially fitted together to extend to adjacent the top of the medium 14, but not into it when the water is being treated, unless the unit is one which has a housing such as shown in FIGS. 3–7. The total capacity of the treatment units 30, 80, 90, 100 and/or 110 is preferably between about 25–250 cubic inches. These quantitative dimensions and amounts are given by way of example only and should not be considered as limiting.

It will also be appreciated that although the invention has been described in terms of a water softening system, the principles of the invention may readily enjoy application to other fluid treatment systems. Moreover, the nature of the treatment media may vary widely, depending upon needs and the treatment desired. For example, in addition to the finely divided metals and activated carbon already mentioned, the finely divided treatment media in the treatment unit chambers can take any one of a number forms, such as particulate, sintered or wools, and they may constitute materials other than or in addition to those previously identified, including sand or other fine filtration media.

It will also be understood that the preferred embodiments of the present invention which have been described are merely illustrative of the principles of the present invention. Numerous modifications may be made by those skilled in the art without departing from the true spirit and scope of the invention.

I claim:

1. A treatment unit for containing a fluid treatment medium; said unit comprising:

a chamber having an inner wall, an outer wall of greater transverse dimension than said inner wall, and a bottom wall which define a space therebetween in the chamber for receiving and containing a finely divided fluid treatment medium;

at least one inlet opening through said inner wall of said chamber for introducing the fluid to be treated to said space so as to pass through the medium to be treated thereby; and at least one outlet opening through another of said walls of said chamber for discharging the fluid which has been treated from the space; the total area of the inlet opening being greater than the total area of said outlet opening and arranged relative to said inlet opening to increase the time that the fluid dwells in the chamber during treatment of the fluid to increase the effectiveness of the treatment; and wherein said inlet opening is positioned adjacent the top of said inner wall, and said outlet opening is positioned adjacent the bottom of the chamber to cause said fluid to flow from the top to the bottom of said space to increase the dwell time of the fluid during treatment.

2. The unit of claim 1, wherein said outlet opening is positioned in said bottom wall.

3. The unit of claim 1, wherein said outlet opening is positioned adjacent the bottom of said inner wall to cause said fluid to flow diagonally through said space to increase the dwell time of the fluid during treatment.

4. The unit of claim 1, including a plurality of said chambers arranged relative to each other so that the inlet openings of at least some of said chambers are arranged in parallel flow relationship to each other.

5. The unit of claim 4, wherein at least some of said chambers are also arranged in series to each other, and wherein one of the series chambers includes said inlet opening and another of the series chambers includes said outlet opening.

6. The unit of claim 4, wherein adjacent ones of said chambers are removably attached to each other.

7. The unit of claim 4, wherein said inner wall of each of said chambers defines a channel for the flow of the fluid.

8. The unit of claim 4, including a housing surrounding and containing at least some of said chambers, said housing being constructed and arranged to receive fluid from or deliver fluid to the chambers which it contains.

9. The unit of claim 8, wherein said housing surrounds and contains all of said chambers.

10. The unit of claim 8, wherein some of said chambers are outside of said housing and the last mentioned chambers have a given cross-sectional area and diameter; and the remaining chambers are within said housing, said housing has a diameter which is substantially equal to said given diameter, and said remaining chambers have a cross-sectional area which is substantially equal to said given cross-sectional area but an overall diameter which is substantially less than said given diameter to define a fluid flow channel between said remaining chambers and said housing.

11. A treatment unit for containing a fluid treatment medium; said unit comprising:

a plurality of chambers having an inner wall, an outer wall of greater transverse dimension than said inner wall, and a bottom wall which define a space therebetween in the chamber for receiving and containing a finely divided fluid treatment medium;

at least one inlet opening through one of said walls of said chambers for introducing the fluid to be treated to said space so as to pass through the medium to be treated thereby;

at least one outlet opening through another of said walls of said chambers for discharging the fluid which has been treated from the space; said outlet opening being constructed and arranged relative to said inlet opening to increase the time that the fluid dwells in the chamber during treatment of the fluid to increase the effectiveness of the treatment;

said plurality of said chambers being arranged relative to each other so that the inlet openings of at least some of said chambers are arranged in parallel flow relationship to each other, and at least some of said chambers are also arranged in series to each other, and wherein one of the series chambers includes said inlet opening and another of the series chambers includes said outlet opening.

12. A treatment unit for containing a fluid treatment medium; said unit comprising:

a plurality of chambers having an inner wall, an outer wall and a bottom wall which define a space therebetween in the chambers for receiving and containing a finely divided fluid treatment medium;

at least one inlet opening through one of said walls of said chambers for introducing the fluid to be treated to said space so as to pass through the medium to be treated thereby; and at least one outlet opening through another of said walls of said chambers for discharging the fluid which has been treated from the space; said outlet opening being constructed and arranged relative to said inlet opening to increase the time that the fluid dwells in the chamber during treatment of the fluid to increase the effectiveness of the treatment;

said plurality of said chambers being arranged relative to each other so that the inlet openings of at least some of said chambers are arranged in parallel flow relationship to each other;

a housing surrounding and containing at least some of said chambers, said housing being construed and arranged to receive fluid from or deliver fluid to the chambers which it contains; and wherein some of said chambers are outside of said housing and the last mentioned chambers have a given cross-sectional area and diameter; and the remaining chambers are within said housing, said housing has a diameter which is substantially equal to said given diameter, and said remaining chambers have a cross-sectional area which is substantially equal to said given cross-sectional area but an overall diameter which is substantially less than said given diameter to define a fluid flow channel between said remaining chambers and said housing.

13. A fluid treatment system for the treating of fluids; said system comprising:

a fluid treatment tank for containing a first fluid treatment medium therein; said tank including an inlet for introducing the fluid to be treated to the tank and an outlet for discharging the fluid which has been treated by the first medium from the tank;

a treatment unit in said tank and positioned to receive the fluid introduced to said tank and treat it before it is treated by the first medium when the first medium is contained in said tank or to receive and treat the fluid after it is treated by the first medium when the first medium is contained in said tank, said unit comprising;

a plurality of chambers each having an inner wall, an outer wall and a bottom wall which define a space therebetween in each of the chambers for receiving and containing a second finely divided fluid treatment medium, said plurality of chambers being coupled to each other to collectively define said unit;

at least one inlet opening through one of said walls of each of said chambers for introducing the fluid which is being treated to said space from the tank inlet and so as to pass through the second medium to be treated thereby; and at least one outlet opening through the another of said walls of each of said chambers for discharging the fluid which has been treated from the space; said outlet opening being constructed and arranged relative to said inlet opening to increase the time that the fluid dwells in the chambers during treatment of the fluid to increase the effectiveness of the treatment.

14. The system of claim 13, wherein said inlet opening is positioned adjacent the top of one of said inner and outer walls, and said outlet opening is positioned adjacent the bottom of the chamber to cause said fluid to flow from the top to the bottom of said space to increase the dwell time of the fluid during treatment.

15. The unit of claim 14, wherein said outlet opening is positioned in said bottom wall.

16. The unit of claim 14, wherein said outlet opening is positioned adjacent the bottom of the other of said inner and outer walls to cause said fluid to flow diagonally through said space to increase the dwell time of the fluid during treatment.

17. The system of claim 14, wherein the area of said inlet opening is greater than the area of said outlet opening to increase the dwell time of the fluid during treatment.

18. The system of claim 13, wherein the area of said inlet opening is greater than the area of said outlet opening to increase the dwell time of the fluid during treatment.

19. The system of claim 13, wherein the inlet openings of at least some of said chambers are arranged in parallel flow relationship to each other.

20. The system of claim 19, wherein at least some of said chambers are also arranged in series to each other, and wherein one of the series chambers includes said inlet opening and another of the series chambers includes said outlet opening.

21. The system of claim 19, wherein adjacent ones of said chambers are removably attached to each other.

22. The system of claim 19, including a housing surrounding and containing at least some of said chambers, said housing being constructed and arranged to receive fluid from or deliver fluid to the chambers which it contains.

23. The system of claim 22, wherein said housing surrounds and contains all of said chambers.

24. The system of claim 22, wherein some of said chambers are outside of said housing and the last mentioned chambers have a given cross-sectional area and diameter; and the remaining chambers are within said housing, said housing has a diameter which is substantially equal to said given diameter, and said remaining chambers have a cross-sectional area which is substantially equal to said given cross-sectional area but an overall diameter which is substantially less than said given diameter to define a fluid flow channel between said remaining chambers and said housing.

25. The system of claim 19, wherein said inner wall of said chambers defines a channel for the flow of the fluid.

26. The system of claim 25, wherein said inlet and said outlet of said tank and the inlet of said unit are at the top of said tank; said outlet of said tank includes a riser conduit which extends from adjacent the bottom of said tank and through said channel of said unit; and wherein said inner wall of said chambers surrounds said riser but is spaced therefrom, whereby said channel communicates the fluid to be treated to said inlet openings of said chambers.

27. The system of claim 26, wherein said system is a water softener system, said first fluid treatment medium is a water softening medium, and control means for periodically reversing the flow of water through said water softening medium and said chambers for regeneration of said water softening medium and backflushing of both said first treatment medium and said second treatment medium.

28. The system of claim 27, including an adapter mounting said treatment unit to at least one of said control means and said tank opening in the top of said tank.

29. The system of claim 27, wherein said second treatment medium is a finely divided metal alloy of copper and zinc.

30. The system of claim 17, wherein said system is a water softener system, said first fluid treatment medium is a water softening medium, and control means for periodically reversing the flow of water through said water softening medium and said units for regeneration of said water softening medium and backflushing of both said first treatment medium and said second treatment medium.

31. The system of claim 30, including an adapter mounting said treatment unit to at least one of said control means and said tank opening in the top of said tank.

32. The system of claim 30, wherein said second treatment medium is a finely divided metal alloy of copper and zinc.

33. The system of claim 13, wherein said system is a water softener system, said first fluid treatment medium is a water softening medium, and control means for periodically reversing the flow of water through said water softening medium and said unit for regeneration of said water softening medium and backflushing of both said first treatment medium and said second treatment medium.

34. The system of claim 31, including an adapter mounting said treatment unit to at least one of said control means and said tank opening in the top of said tank.

35. The system of claim 33, wherein said second treatment medium is a finely divided metal alloy of copper and zinc.

36. The system of claim 13, wherein said treatment unit is a pretreatment unit which is arranged in said tank to pretreat the fluid prior to the treatment by said first fluid treatment medium.

37. The system of claim 13, wherein said treatment unit is a post treatment unit which is arranged in said tank to treat the fluid after the treatment by said first fluid treatment medium.

* * * * *

UNITED STATES PATENT AND TRADEMARK OFFICE
CERTIFICATE OF CORRECTION

PATENT NO.    : 6,090,285
DATED         : July 18, 2000
INVENTOR(S)   : Yiu Chau Chau It is certified that error appears in the above-identified patent and that said Letters Patent is hereby corrected as shown below:

Column 4,
Line 27, change "sill" to -- still --.

Column 7,
Line 23, change the formula "P D/A" to -- P ∝ DA --.

Column 14,
Line 29, change "inner" to -- outer --.

Column 15,
Line 44, change "construed" to -- constructed --.

Column 17,
Line 2, delete "and the inlet of said unit".
Line 5, delete "of said unit".
Line 26, change "units" to -- unit --.

Column 18,
Line 13, change "31" to -- 33 --.

Signed and Sealed this

Twenty-seventh Day of April, 2004

JON W. DUDAS
*Acting Director of the United States Patent and Trademark Office*